(12) United States Patent
Dybsetter et al.

(10) Patent No.: US 7,606,486 B2
(45) Date of Patent: Oct. 20, 2009

(54) PROTOCOL SPECIFIC TRANSCEIVER FIRMWARE

(75) Inventors: Gerald L. Dybsetter, Scotts Valley, CA (US); Jayne C. Hahin, Cupertino, CA (US); Luke M. Ekkizogloy, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/119,447

(22) Filed: Apr. 29, 2005

(65) Prior Publication Data

US 2006/0051097 A1 Mar. 9, 2006

Related U.S. Application Data

(60) Provisional application No. 60/607,539, filed on Sep. 7, 2004.

(51) Int. Cl.
*H04B 10/00* (2006.01)
*H04B 10/08* (2006.01)
(52) U.S. Cl. .................. 398/25; 398/135; 398/136
(58) Field of Classification Search .............. 398/25, 398/74, 135–138, 127, 128, 176, 177
See application file for complete search history.

(56) References Cited

U.S. PATENT DOCUMENTS

| | | | |
|---|---|---|---|
| 3,909,791 A | 9/1975 | van den Berg | |
| 4,330,870 A | 5/1982 | Arends | |
| 5,550,666 A | 8/1996 | Zirngibl | |
| 5,778,218 A | 7/1998 | Gulick | |
| 5,845,077 A | 12/1998 | Fawcett | |
| 5,956,168 A * | 9/1999 | Levinson et al. ............... | 398/41 |
| 6,449,075 B1 * | 9/2002 | Watson et al. ............... | 398/121 |
| 6,735,731 B2 | 5/2004 | Ewen et al. | |
| 6,862,322 B1 | 3/2005 | Ewen et al. | |
| 7,080,245 B2 | 7/2006 | Ballard et al. | |
| 7,146,412 B2 | 12/2006 | Turnbull | |
| 7,269,191 B2 | 9/2007 | Stewart et al. | |
| 2002/0112070 A1 * | 8/2002 | Ellerbrock et al. .......... | 709/238 |
| 2002/0176138 A1 | 11/2002 | Schlanger | |
| 2003/0002108 A1 | 1/2003 | Ames et al. | |
| 2004/0017794 A1 * | 1/2004 | Trachewsky ................ | 370/338 |

(Continued)

FOREIGN PATENT DOCUMENTS

JP 59110227 6/1984

OTHER PUBLICATIONS

U.S. Appl. No. 11/256,498, filed Oct. 21, 2005, Jayne C. Hahin.

(Continued)

*Primary Examiner*—Dalzid Singh
(74) *Attorney, Agent, or Firm*—Workman Nydegger

(57) ABSTRACT

An optical transceiver (or optical transmitter or optical receiver) that has at least one processor, and a memory. The optical transceiver is capable of implementing any one of a number of protocols depending on how the optical transceiver is configured in microcode. In order to so configure the optical transceiver, the optical transceiver is provided with one of a particular set of microcode, each of the set of microcode being capable of implementing a different protocol when received into the memory and executed. To implement the protocol, the provided microcode is then executed by the optical transceiver. To implement a different protocol, different microcode may be provided to the optical transceiver and executed.

18 Claims, 2 Drawing Sheets

U.S. PATENT DOCUMENTS

| | | | |
|---|---|---|---|
| 2004/0022537 A1 | 2/2004 | Mecherle et al. | 398/41 |
| 2004/0052528 A1* | 3/2004 | Halgren et al. | 398/75 |
| 2004/0202476 A1* | 10/2004 | Woolf et al. | 398/135 |
| 2004/0260798 A1 | 12/2004 | Addington et al. | |
| 2005/0044335 A1 | 2/2005 | Bee et al. | |

OTHER PUBLICATIONS

U.S. Appl. No. 11/256,329, filed Oct. 21, 2005, Luke M. Ekkizogloy.

U.S. Appl. No. 11/256,290, filed Oct. 21, 2005, Gerald L. Dybsetter.

* cited by examiner

PROTOCOL SPECIFIC TRANSCEIVER FIRMWARE

CROSS-REFERENCE TO RELATED APPLICATIONS

This application claims the benefit of U.S. Provisional Application No. 60/607,539, filed Sep. 7, 2004, which is incorporated herein by reference in its entirety.

BACKGROUND OF THE INVENTION

1. The Field of the Invention

The present invention relates generally to optical transmitters and receivers. More specifically, the present invention relates to optical transmitter and receivers that are capable of running different versions of microcode to manage its operation.

2. Background and Relevant Art

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed through it, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser) configured to control the operation of the optical transmitter in response to various control inputs. The optical transceiver also generally includes an amplifier (e.g., often referred to as a "post-amplifier") configured to amplify the channel-attenuated received signal prior to further processing. A controller circuit (hereinafter referred to as the "controller") controls the operation of the laser driver and post-amplifier.

Controllers are typically implemented in hardware as state machines. Their operation is fast, but inflexible. Being primarily state machines, the functionality of the controller is limited to the hardware structure of the controller. Most optical transceiver are, for example, limited to a particular protocol, and cannot be easily changed to operate using other protocols. What would be advantageous are controllers that have more flexible functionality to communicate using a wide variety of communication protocols.

BRIEF SUMMARY OF THE INVENTION

The foregoing problems with the prior state of the art are overcome by the principles of the present invention, which relate to an optical transceiver (or optical transmitter or optical receiver) that has at least one processor, and a memory. The optical transceiver is capable of implementing any one of a number of protocols depending on how the optical transceiver is configured in microcode. In order to configure the optical transceiver to operate using a particular protocol, the optical transceiver is provided with one of a particular set of microcode, each of the set of microcode being capable of implementing a different protocol when received into the memory and executed. To implement the protocol, the provided microcode is then executed by the optical transceiver. If the optical transceiver is to then implement a different protocol, different microcode may be provided to the optical transceiver and executed. Accordingly, a single optical transceiver is flexible enough to support communication using any number of protocols as desired.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention relate to an optical transceiver (or transmitter or receiver), including a memory and a processor, which is capable of supporting different optical transceiver protocols. Each of the protocols may be implemented by receiving microcode structured to that protocol into the memory. The processor may later execute the microcode and cause the transceiver to perform operational functions of the specified protocol. If a different protocol is to be implemented, different microcode may be loaded into the memory and executed. An example operational optical transceiver environment will first be described. Then, the operation in accordance with the invention will be described with respect to the operational environment.

Figure 1:
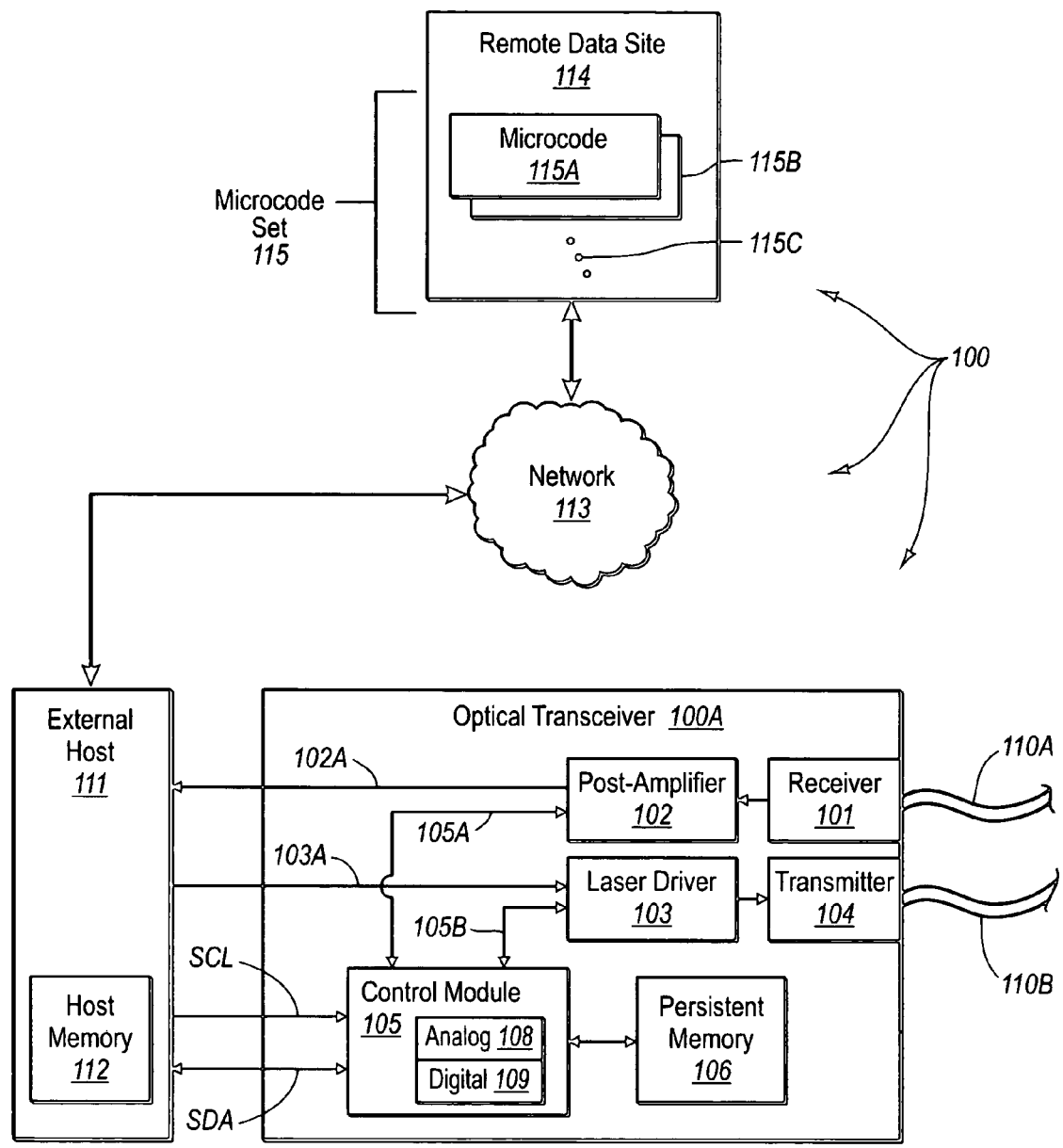
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1G, 2G, 4G, 8G, 10G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/ or the laser driver 103 as also represented by the arrows 105A and 105B. These settings adjustments are quite intermittent since they are only made when temperature or voltage or other low frequency changes so warrant. Receive power is an example of such a low frequency change.

The control module 105 may have access to a persistent memory 106, which in one embodiment, is an Electrically Erasable and Programmable Read Only Memory (EEPROM). The persistent memory 106 and the control module 105 may be packaged together in the same package or in different packages without restriction. Persistent memory 106 may also be any other non-volatile memory source.

Figure 2:
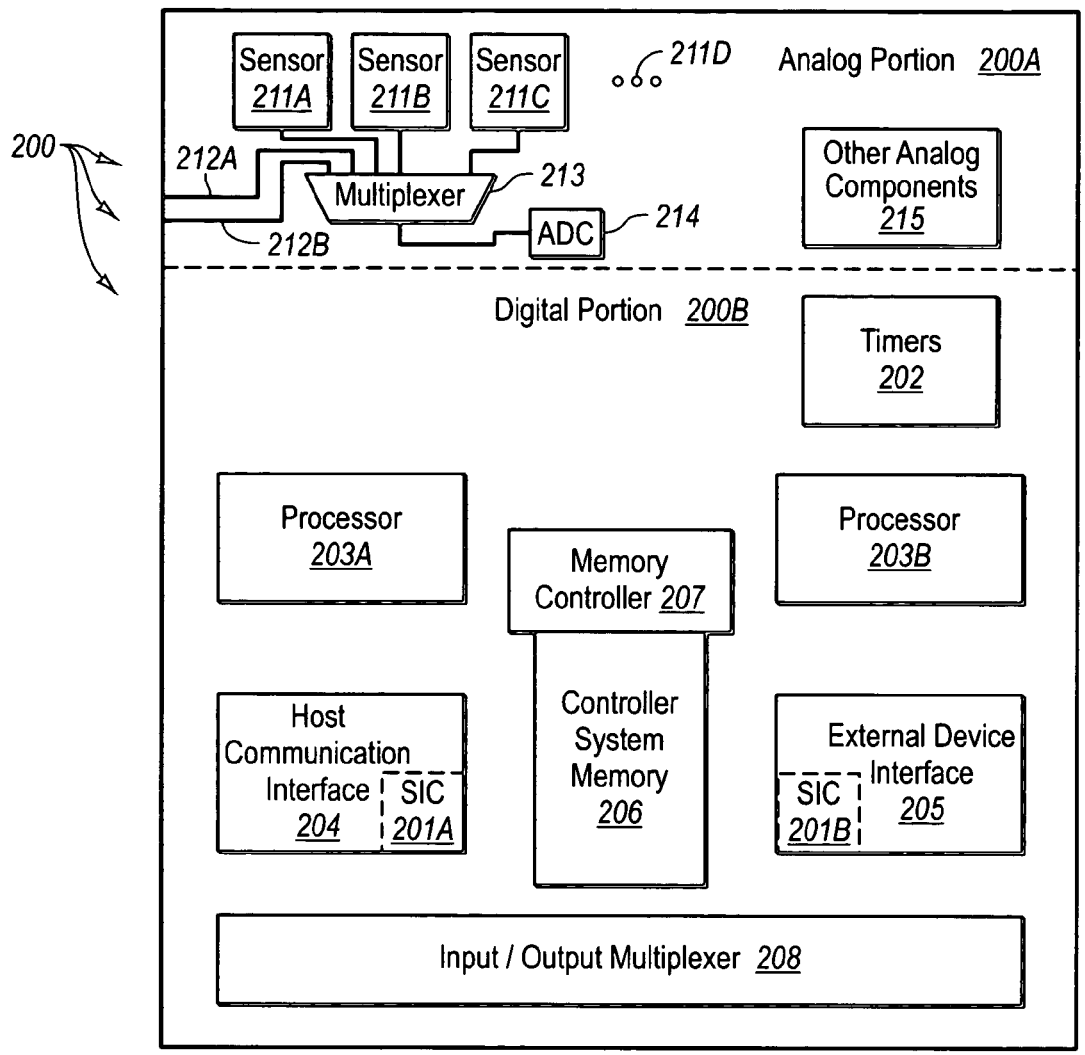
FIG. 2 schematically illustrates an example of a control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111, possibly implemented using a two-wire interface such as I²C shown in FIG. 1 as the serial data (SDA) and serial clock (SCL) lines on the optical transceiver 100. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input/output nodes within the control module 200 than there are pins available on the control module 200, thereby reducing the footprint of the control module 200.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. Accordingly, the principles of the present invention relate to an optical transceiver capable of implementing protocols as identified by a user. The operational protocols are implemented by the selection of specific microcode relating to each operational protocol. The principles of the present invention will be discussed with reference to the environment described in relation to FIGS. 1 and 2.

Conventional transceivers implement one specific transceiver protocol. This specific protocol was often times determined by the transceiver manufacturer. This was considered sufficient for conventional transceivers. However, if a user wanted to implement a different transceiver protocol, it was often necessary to purchase a new transceiver module. This was costly and time consuming. Furthermore, if a manufacturer of optical transceivers were to offer optical transceivers that implement different protocols, the actual hardware of the optical transceiver may differ to support the protocol implemented.

The principles of the present invention make it possible to configure transceiver 100A in a way that allows transceiver 100A to potentially implement any desired transceiver protocol. This is accomplished through the use of microcode (herein after also referred to as "protocol microcode") that is structured to implement different transceiver protocols. A user or manufacturer need load the appropriate protocol into the optical transceiver memory, and execute that microcode to cause transceiver 100A to implement the desired protocol. If a different protocol is to be implemented instead, then different protocol microcode may be loaded and executed instead or in addition.

There are many possible transceiver protocols which may be implemented by transceiver 100A. In the written description and in the claims, "protocol" is defined as an agreed upon format for transmitting data between two devices and/or the rate at which the protocol transmits the data. Some common protocols that transceiver 100A may be configured by microcode to implement are 1G Synchronous Optical NETwork ("SONET"), 2G SONET, 4G SONET, 8G SONET, 10G SONET, 1G fibre channel, 2G fibre channel, 4G fibre channel, 8G fibre channel, 10G fibre channel, 1G Ethernet, 2G Ethernet, 4G Ethernet, 8G Ethernet, 10G Ethernet, 1G Gigabit Ethernet, 1G Gigabit Ethernet, 2G Gigabit Ethernet, 4G Gigabit Ethernet, 8G Gigabit Ethernet, 10G Gigabit Ethernet, 1G fast Ethernet, 2G fast Ethernet, 4G fast Ethernet, 8G fast Ethernet, 10G fast Ethernet, 1G optical Ethernet, 2G optical Ethernet, 4G optical Ethernet, 8G optical Ethernet, and 10G optical Ethernet. This list is not intended to be exhaustive and should not be read to limit the claims. It may be possible to configure transceiver 100A by microcode to implement numerous other transceiver protocols, whether now existing or whether not yet developed.

In one embodiment, transceiver 100A may be communicatively connected to host 111. Host 111 may be any computing system capable of connection to the internet or some other wide area network 113. This connection may be achieved by any standard internet or wide area network protocol (not to be confused with the transceiver protocol of the present invention). Host 111 may be able to access over the wide area network 113 a remote data site 114. The remote data site 114 may be a network server or similar device.

The remote data site 114 may be configured to allow a user to identify and select various desired transceiver protocols through use of an interface such as a World Wide Web site. For example, the World Wide Web site may include a Web page that contains radio buttons that correspond to transceiver protocols. A user may identify a desired protocol by selecting the radio button for that feature using a keyboard or a mouse connected to host 111. This process may be repeated as appropriate for as many additional protocols as desired.

The remote data site 114 may be further configured to contain a library of microcode 115 (e.g., including protocol microcode 115A, 115B, amongst potentially other protocol microcode as represented by the ellipses 115C). Each protocol microcode corresponds to one or more specific transceiver protocols. The remote data site 114 may access the specific microcode corresponding to the protocol identified by the selected radio button. The remote data site 114 may then send the specific microcode to host 111 for further use. In some instances a user may identify more than one desired operational feature by selecting multiple radio buttons. The remote data site may then send multiple protocol microcode to host 111 for further use. In an alternative embodiment, the host may already be configured with an initially non-accessible form of a set of multiple protocol microcodes. In that case, instead of downloading the selected protocol microcodes, the host 111 is provided with information needed to access the appropriate protocol microcodes.

Host 111 may download the protocol microcode from the remote data site 114 over the wide area network 113 as described. Host 111 may then provide the protocol microcode to transceiver control module 105 over the SDA and SCL lines or other implemented host interface. The microcode may be stored in persistent memory 106 for later execution. Alternatively, the microcode may be directly loaded into controller system memory 206 for immediate execution.

In another embodiment, it may be possible to load the protocol microcode directly into persistent memory 106. A user may identify desired protocols using the remote data site 114 as discussed previously. The protocol microcode may then be placed in persistent memory 106 by the transceiver 100A manufacturer. Alternatively, the user may load the microcode into persistent memory 106 from a temporary storage unit such as a digital video disk (DVD) or a compact disk (CD) ROM provided by the transceiver 100A manufacturer. For example, if the persistent memory 106 was a separate module such as, for example, an EEPROM module, the persistent memory 106 could be unplugged from the optical transceiver 100A for loading the appropriate protocol microcode. Alternatively, the persistent memory 106 could be loaded with the appropriate protocol microcode without removal from the optical transceiver 100A if the optical transceiver has an external I/O interface that would allow access to the persistent memory 106.

Control module 105 executes the microcode received from the remote data site 114 or other source. Specifically, processors 203 load the protocol microcode into the controller system memory 206. Alternatively, the processors 203 may load microcode stored in persistent memory 106 into controller system memory 206. The processors 203 execute the microcode, causing transceiver 100A to implement the selected protocol. For example, executing the microcode structured to implement a 1G SONET protocol will cause transmitter 104 to transmit data and receiver 101 to receive data in accordance with that protocol. In like manner, having processors 203 execute other protocol microcodes will cause transceiver 100A to perform operational functions of the specified protocol.

A specific example of the present invention will be described. Suppose a user desires to implement a 1G fibre channel protocol. The user would access the remote data site 114 using host 111. Using the mouse or keyboard attached to host 111, the user would identify and select the radio button(s) corresponding to the 1G fibre channel protocol. The remote data site 114 would then access the protocol microcode that would cause transceiver 100A to implement the 1G fibre channel protocol. The data site 114 would then provide the microcode to host 111.

Host 111 would then load the protocol microcode into persistent memory 106. Processors 203 would load the microcode from persistent memory 106 into controller system memory 206 and execute the microcode. This would cause transceiver 100A to transmit and receive data at the 1G fibre channel protocol using the various transceiver 100A components as described in the transceiver environment with respect to FIGS. 1 and 2.

Figure 3:
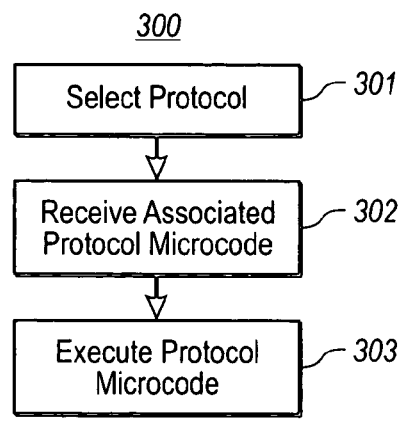
FIG. 3 illustrates a flowchart of a method for configuring the optical transceiver to implement a specific one of the plurality of protocols in accordance with the principles of the invention.

Although a specific example of implementing a transceiver protocol was described in detail, it should be noted that all other transceiver protocols may be implemented in a like manner. For instance, FIG. 3 illustrates a flowchart of a method 300 for configuring the optical transceiver to implement a specific one of the plurality of protocols in accordance with a general embodiment of the invention.

Here, a specific protocol microcode is selected for loading into the optical transceiver (act 301). This selection process may be made by a user, tester, distributor, or manufacturer of the optical transceiver, or by any other entity. The protocol microcode is then received into the memory of the optical transceiver (act 302). Here, the term "memory" should be interpreted broadly as including any memory of any size and form that is capable of storing information in a volatile and/or non-volatile state. The microcode may be received from any location, whether from a remote location, and/or locally (e.g., from the external host). The protocol microcode is then executed (act 303) thereby causing the optical transceiver to implement the protocol. This method 300 may be repeated for different protocols.

For instance, in the specific example described above, the optical transceiver first implemented the 1G fibre channel protocol. However, a user may later desire to change the transceiver protocol. The user would access the remote data site 114 and begin the process again for a new protocol. For example, if the transceiver were implementing the 1G fibre channel protocol and it became necessary to switch to a 2G SONET protocol, a user would download the microcode for 2G SONET protocol from the remote data site 114 and cause the microcode to be loaded into system memory controller and executed by processors 230. This would cause transceiver 100A to perform operational functions of the 2G SONET protocol. In this way, transceiver 100A may continually update the transceiver protocol as circumstances and needs dictate.

Accordingly, the principles of the present invention provide for an optical transceiver with many benefits over current optical transceivers. Specifically, the present invention allows for easy selection and implementation of transceiver protocols. A user has the ability to select a desired protocol from a remote source. Microcode that implements each selected protocol can be downloaded to the optical transceiver and executed. This allows the user to control what protocol the transceiver will implement. In addition, the user may repeat the process as necessary to change protocols when circumstances dictate. Accordingly, the principles of the present invention represent a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. In an optical transceiver that includes a memory and at least one processor, a method comprising the following:
   an act of receiving microcode that is configured to implement the specified data communication protocol into the memory, wherein the microcode is one of a set of microcode, wherein each of the set of microcode is capable of implementing a different data communication protocol when received into the memory and executed, wherein the act of receiving microcode that is configured to implement the specified data communication protocol into the memory comprises the following:
      an act of receiving, via a first device, access information needed to access the microcode; and
      an act of using the access information to access the microcode; and
   an act of executing the received microcode, wherein the microcode is structured such that when executed by the at least one processor, the optical transceiver is caused to perform transceiver operational functions of the specified data communication protocol so as to enable data communications between the first device and a second device each communicatively coupled to the optical transceiver.

2. A method in accordance with claim 1, further comprising:
an act of selecting the specific data communication protocol to be implemented on the optical transceiver.

3. The method of claim 2, wherein the act of selecting the specific data communication protocol to be implemented on the optical transceiver includes receiving a user selection of the specific data communication protocol.

4. A method in accordance with claim 1, wherein the specified data communication protocol is selected from the group consisting of 1G Synchronous Optical NETwork ("SONET"), 2G SONET, 4G SONET, 8G SONET, 10G SONET, 1G fibre channel, 2G fibre channel, 4G fibre channel, 8G fibre channel, 10G fibre channel, 1G Ethernet, 2G Ethernet, 4G Ethernet, 8G Ethernet, 10G Ethernet, 1G Gigabit Ethernet, 1G Gigabit Ethernet, 2G Gigabit Ethernet, 4G Gigabit Ethernet, 8G Gigabit Ethernet, 10G Gigabit Ethernet, 1G fast Ethernet, 2G fast Ethernet, 4G fast Ethernet, 8G fast Ethernet, 10G fast Ethernet, 1G optical Ethernet, 2G optical Ethernet, 4G optical Ethernet, 8G optical Ethernet, and 10G optical Ethernet.

5. A method in accordance with claim 1, wherein the first device is an external host coupled to the optical transceiver and wherein the act of receiving microcode that is configured to implement the specified data communication protocol into the memory comprises the following: an act of receiving the microcode from the external host.

6. A method in accordance with claim 1, wherein the act of receiving microcode that is configured to implement the specified data communication protocol into the memory comprises the following:
an act of receiving the microcode from a remote network site via the first device.

7. A method in accordance with claim 1, wherein the microcode is first microcode, and the specified data communication protocol is a first specified data communication protocol, the method further comprising:
an act of receiving second microcode that is configured to implement a second specified data communication protocol into the memory; and
an act of executing the received second microcode, wherein the second microcode is structured such that when executed by the at least one processor, the optical transceiver is caused to perform transceiver operational functions of the second specified data communication protocol so as to enable data communications between the first device and a third device communicatively coupled to the optical transceiver.

8. The method of claim 1, wherein the act of receiving microcode includes the act of receiving new and/or additional microcode from a remote source via the first device.

9. A method in accordance with claim 1, wherein the transceiver operational functions caused to be performed by the optic transceiver comprise sending and receiving data over optical fibers using the specified data communication protocol.

10. An opto-electronic module comprising:
a memory;
a laser transmitter
at least one processor communicatively coupled to the memory so as to be capable of executing microcode from the memory; and
a mechanism for receiving microcode into the memory, wherein the laser transmitter is configured to operate using different data communication protocols depending on the microcode stored in the memory so as to enable transmission of data from a first device to a second device via the opto-electronic module, wherein the mechanism for receiving microcode configured to implement the different data communication protocols into the memory is configured to receive, via the first device, access information needed to access the microcode, and use the access information to access the microcode.

11. An opto-electronic module in accordance with claim 10, wherein the opto-electronic module is an optical transceiver.

12. The optical transmitter of claim 10, wherein the mechanism for receiving microcode is configured to receive, via the first device, new and/or additional microcode from a remote source.

13. The opto-electronic module as recited in claim 10, further comprising an optical detector configured to operate using different data communication protocols depending on the microcode stored in the memory.

14. An opto-electronic module comprising:
a memory;
a photodiode receiver;
at least one processor communicatively coupled to the memory so as to be capable of executing microcode from the memory; and
a mechanism for receiving microcode from a remote source into the memory, wherein the photodiode receiver is configured to operate using different data communication protocols depending on the microcode stored in the memory so as to enable reception of data at a first device from a second device via the opto-electronic module, wherein the mechanism for receiving microcode configured to implement the different data communication protocols into the memory is configured to receive, via the first device, access information needed to access the microcode, and use the access information to access the microcode.

15. The opto-electronic module of claim 14, wherein the opto-electronic module is an optical transceiver.

16. In an optical transceiver that includes a memory and at least one processor, the optical transceiver being capable of implementing any one of a plurality of optical communication protocols depending on how the optical transceiver is configured in microcode, a method for configuring the optical transceiver to implement a specific one of the plurality of optical communication protocols, the method comprising the following:
an act of receiving microcode that is configured to implement the specified optical communication protocol into the memory, wherein the microcode is one of a set of microcode, wherein each of the set of microcode is capable of implementing a different optical communication protocol when received into the memory and executed, wherein the act of receiving microcode that is configured to implement the specified data communication protocol into the memory comprises the following:
an act of receiving, via a first device, access information needed to access the microcode; and
an act of using the access information to access the microcode; and
an act of executing the received microcode, wherein the microcode is structured such that when executed by the at least one processor, the optical transceiver is caused to perform transceiver operational functions of the specified optical communication protocol, wherein the specified optical communication protocol is selected from the group consisting of: 1G Synchronous Optical NETwork ("SONET"), 2G SONET, 4G SONET, 8G SONET, 10G SONET, 1G fibre channel, 2G fibre channel, 4G fibre channel, 8G fibre channel, 10G fibre channel, 1G Ethernet, 2G Ethernet, 4G Ethernet, 8G Ethernet, 10G Ethernet, 1G Gigabit Ethernet, 1G Gigabit Ethernet, 2G Gigabit Ethernet, 4G Gigabit Ethernet, 8G Gigabit Ethernet, 10G Gigabit Ethernet, 1G fast Ethernet, 2G fast Ethernet, 4G fast Ethernet, 8G fast Ethernet, 10G fast Ethernet, 1G optical Ethernet, 2G optical Ethernet, 4G optical Ethernet, 8G optical Ethernet, and 10G optical Ethernet.

17. The opto-electronic module as recited in claim 4, further comprising an LED or laser transmitter, the LED or laser transmitter being configured to operate using different data communication protocols depending on the microcode stored in the memory.

18. A method in accordance with claim 16, wherein the transceiver operational functions caused to be performed by the optic transceiver comprise sending and receiving data over optical fibers using the specified data communication protocol.

* * * * *